Nov. 5, 1935.  W. LIEHR ET AL  2,019,824

METHOD OF PREPARING A PEAT CONTAINING FERTILIZER

Filed Nov. 4, 1932

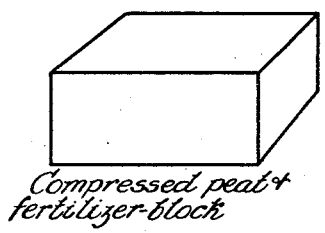

Fig. 1.

Compressed peat +
fertilizer-block

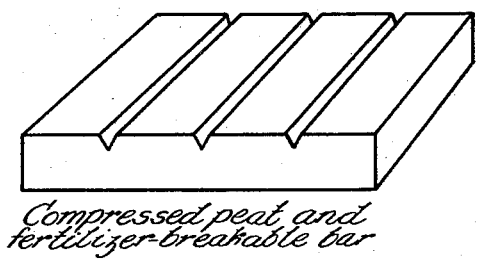

Fig. 2.

Compressed peat and
fertilizer-breakable bar

Fig. 3.

Compressed peat and
fertilizer-pellet

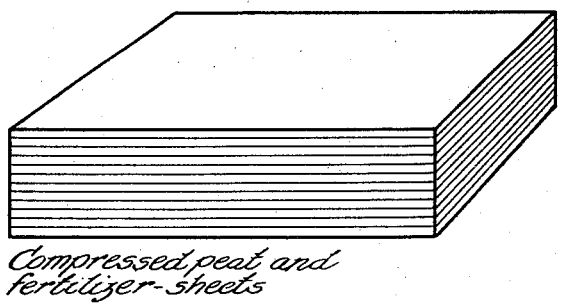

Fig. 4.

Compressed peat and
fertilizer-sheets

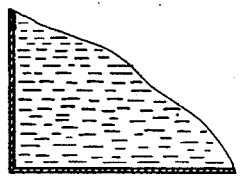

Fig. 5.

Compressed peat +
fertilizer-flakes

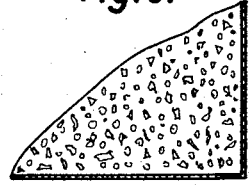

Fig. 6.

Compressed peat +
fertilizer-pellets

Inventors
W. Liehr
E. Dyckerhoff

By Blair + Kilcoyne
Attorneys

Patented Nov. 5, 1935

2,019,824

UNITED STATES PATENT OFFICE 2,019,824

METHOD OF PREPARING A PEAT-CONTAINING FERTILIZER

Werner Liehr, Poggenhagen, near Neustadt am Rubenberge, and Eduard Dyckerhoff, Schloss Blumenau, near Wunstorf, Germany; said Liehr assignor to said Dyckerhoff Application November 4, 1932, Serial No. 641,310
In Germany December 9, 1931

6 Claims. (Cl. 71—9)

This invention relates to the use of peat in plant cultivation and has for its object to provide an improved material containing peat for the promotion of plant cultivation.

Peat has already been frequently employed for promoting plant growth. In the form of peat mould for instance it has been mixed with the soil in order that the moistness of the latter may be maintained longer, or in order to loosen the soil. The peat mould has also been mixed with such artificial fertilizers as are inclined to cake together, in order properly to distribute the fertilizer.

Such loose mixtures have the disadvantage that generally they can only be prepared on the spot shortly before use. It is known to compress a mixture of peat mould and fertilizers into balls, but this form is not convenient for long storage or for transport in large quantities.

In accordance with the principal feature of the present invention a mixture of dry peat (not raw peaty material) and plant fertilizing, protecting or the like material is compressed at a relatively high pressure, and preferably the mixture is compressed into small bodies of suitable shape such as blocks, briquettes, dice, plates, flakes, laminae small balls etc. The use of a relatively high pressure causes a colloidal chemical change to take place in the peat material.

The relatively high pressure, 130–150 kg/cm$^2$ for instance causes the peat constituent of the mixture to undergo a surprising and unexpected alteration, the humus constituents of the peat which normally are insoluble in water becoming soluble. This of course is nothing less than the conversion of the peat material into useful cultivating humus. This new property of the product, therefore, now permits the plant to benefit fully by the nutriment contained in soil treated with the product.

In the form of small bodies such as hereinbefore referred to the product readily gives up its nutriment to the roots of plants after treatment with water.

The specific range of pressures referred to has been given solely by way of example, the invention not being limited to the stated range.

In accordance with a preferred embodiment of the invention, a quantity of water-resisting peat is added to the mixture to be compressed. Furthermore the dry peat may be wholly replaced by water-resisting peat. By the term water-resisting peat is meant peat which has been treated for example by heating to 120° C. so as to render it resistant to the absorption or emission of liquids or solutions. A suitable process of treatment for this purpose is described in U. S. Patent specification No. 1,446,888 dated February 27, 1923. Under the action of high pressure the fertilizer will enter the water-resisting peat and ordinary peat to the same extent. The fertilizer is thus stored up with the result that the material mixed with the soil contains a reserve of fertilizing material, which is gradually given up.

The fertilizer taken up by ordinary peat is immediately available for use, whereas the water-resisting peat retains the fertilizer, which has been pressed into it under high pressure, for a longer time owing to the moisture in the soil taking longer to penetrate into this water-resisting peat and dissolve the fertilizer, so that the latter can be absorbed by the plant.

In employing the two different kinds of peat in this manner a correspondingly larger quantity of fertilizer or other nutritious material or a stronger concentration of this material may be adopted, since there is no risk that the material will be supplied to the plant all at once, too quickly or in too great a quantity, as the emission of the fertilizing or other nutritious material is considerably retarded owing to the addition of the water-resisting peat, so that an even distribution over a long period of time is ensured. The mild and long continued action, to which value is attached in natural fertilization, is therefore reliably obtained and even increased in this manner and the action can evidently be regulated by varying the proportion of water-resisting peat added.

Tests have shown conclusively that in this manner as much as five times the amount of nitrogen which is usually regarded as the maximum can be provided for the principal cultivated plants, without harm to the latter. The process also results in a far better distribution of the action of the fertilizer than has hitherto been the case.

A particular advantage of the invention is the great decrease in volume which occurs when the mixture of peat and fertilizer is compressed under high pressure, by rolling or otherwise, into briquettes, dice, or other convenient forms. These compact and durable bodies are suitable for transport and storage over relatively long periods and the material can be prepared for immediate use simply by adding water and mixing it into the soil. In such forms moreover the material, unlike the balls referred to, is suitable for use in agriculture and forestry on account of its small bulk.

The material may if desired be mixed into the soil in a dry state, in the form of plates (flakes for instance) or small balls, or in any other suitable form. In this case the particles of the material which are in a highly compressed state will expand considerably owing to the moisture in the soil, with the result that the latter will be loosened considerably.

As regards the fertilizers or nutritious substances natural or artificial fertilizers of all kinds, particularly in the form of aqueous solutions may be employed. Furthermore, such substances may be added as will ward off or destroy any animal or vegetable action which may be harmful to the plant, while other materials containing favourable soil bacteria or which promote the activity of the soil bacteria may also be added. Any substance, therefore, which will promote plant cultivation in some way may be mixed with the peat, either alone or together with other such substances. In all cases the highly absorbent nature of the peat is particularly favourable to the use of these substances.

The addition to or admixture with the dry peat of fertilizers in the form of aqueous solutions may be effected in various ways, the fertilizer being for example applied to the dry peaty mass in a finely-divided form by means of a spray.

The water-resisting peat may also be added subsequently, the ordinary peat and fertilizers being for instance first subjected to high pressure, the water-resisting peat then added and the mixture if desired then compressed again to such an extent only that the mixture will cohere.

From the foregoing it will be seen that the invention adds considerably to the usefulness of peat in plant cultivation. This applies particularly to the new convenient forms in which the compressed peat mixture may be put on the market, in which forms it is very convenient for transport and storage, taking up very little space.

In the accompanying drawing is illustrated some examples of the forms in which the product may be prepared.

In the drawing:—

Figure 1 illustrates a die or briquette of convenient shape. Such bodies can be packed and distributed singly or in quantities, in suitable packages.

Figure 2 illustrates a plate of the material divided by grooves or recesses like a cake of chocolate, the various portions being readily broken off.

Figure 3 illustrates a small egg-shaped body which may be formed by pressing or rolling the material.

Figure 4 illustrates a pile of sheets such as may be produced by rolling the material under pressure and which can be placed on the market in any desired quantity, size and shape in any suitable packing.

In all of these forms division before use may be simplified by suitably profiling or indenting the pressed or rolled briquette or plate.

The new material may also be supplied in the form of small sheets or flakes as illustrated in Figure 5, or in the form of small balls or granules as illustrated in Figure 6. In such forms the material may be distributed in any suitable packing (sacks, bags, small boxes, cartons, etc.) and can be mixed directly with the soil as required without any previous addition of moisture.

Having now described our invention, what we claim as new and desire to secure by Letters Patent is:—

1. A process for the production of a material for promoting plant cultivation which consists in preparing a mixture including dry peat and plant fertilizing material, and subjecting said mixture to a pressure not less than 130 kg/cm$^2$ and sufficiently high to cause a colloidal change in the peat without the application of external heat.

2. A process for the production of a material for promoting plant cultivation which consists in subjecting a mixture of dry peat and plant fertilizing material in a cold condition to a pressure of at least 130 kg/cm$^2$ causing a colloidal chemical change in the peat.

3. A process for the production of a material for promoting plant cultivation which consists in subjecting a mixture of dry peat and plant fertilizing material to a pressure of 130 to 150 kg/cm$^2$ sufficient to cause a colloidal chemical change in the peat without the application of external heat.

4. A process for the production of a material for promoting plant cultivation which consists in subjecting a mixture of dry peat, water resisting peat and plant fertilizing material in a cold condition to a pressure of at least 130 kg/cm$^2$.

5. A process for the production of a material for promoting plant cultivation which consists in subjecting a mixture of dry peat, water resisting peat and a liquid fertilizing material to a pressure of 130 to 150 kg/cm$^2$.

6. A process for the production of a material for promoting plant cultivation which consists in compressing a mixture containing dry peat and plant fertilizing material into relatively small bodies by the application of a pressure of 130 to 150 kg/cm$^2$ in a cold condition.

WERNER LIEHR.
EDUARD DYCKERHOFF.